(12) United States Patent
Amzal

(10) Patent No.: US 12,293,302 B2
(45) Date of Patent: May 6, 2025

(54) MULTIDIMENSIONAL HIERARCHY LEVEL RECOMMENDATION FOR FORECASTING MODELS

(71) Applicant: SAP SE, Walldorf (DE)

(72) Inventor: Mokrane Amzal, Courbevoie (FR)

(73) Assignee: SAP SE, Walldorf (DE)

( * ) Notice: Subject to any disclaimer, the term of this patent is extended or adjusted under 35 U.S.C. 154(b) by 775 days.

(21) Appl. No.: 17/000,503

(22) Filed: Aug. 24, 2020

(65) Prior Publication Data

US 2022/0058499 A1 Feb. 24, 2022

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ............ G06N 20/00; G06N 5/04; G06N 3/00; G06N 5/00; G06N 7/00; G06N 10/00; G06N 99/00
See application file for complete search history.

(56) References Cited

U.S. PATENT DOCUMENTS

| | | | |
|---|---|---|---|
| 9,530,228 B1 * | 12/2016 | Fermum | G06T 11/206 |
| 2004/0181519 A1 * | 9/2004 | Anwar | G06F 16/283 |
| | | | 707/999.003 |
| 2009/0228436 A1 * | 9/2009 | Pasumansky | G06F 16/283 |
| | | | 707/999.102 |
| 2018/0081953 A1 * | 3/2018 | Goedken | G06F 16/282 |

OTHER PUBLICATIONS

Lusis et al., Short-term residential load forecasting: Impact of calendar effects and forecast granularity, Applied Energy 205 (2017), 654-669 (Year: 2017).*
Perez et al., Hierarchical Aggregation Prediction Model, JMLRL Workshop and Conference Proceedings 11, KDD CUP (2010), 1-14 (Year: 2010).*
Jo et al., Improving Protein Fold Recognition by Deep Learning Networks, Scientific Reports (2015), 1-11 (Year: 2015).*
Bauer et al., An Automated Forecasting Framework based on Method Recommendation for Seasonal Time Series, ICPE (2020), 48-55 (Year: 2020).*
Yang et al., Machine Learning Differential Privacy With Multifunctional Aggregation in a Fog Computing Architecture, Special Section on Cyber-Physical-Social Computing and Networking (2018), 17119-17129 (Year: 2018).*

* cited by examiner

*Primary Examiner* — Luis A Sitiriche
(74) *Attorney, Agent, or Firm* — Buckley, Maschoff & Talwalkar LLC

(57) ABSTRACT

Provided is a system and method for identifying and recommending the best hierarchical levels for training a predictive model such as a time-series forecasting model. In one example, the method may include receiving an identification of a measure of multidimensional data, generating a plurality of training data sets that comprise different combinations of hierarchical dimension granularities of aggregation, training a plurality of instances of a machine learning model based on the plurality of training data sets, respectively, and determining and outputting predictive accuracy values of the plurality of instances of the trained machine learning model.

20 Claims, 9 Drawing Sheets

FIG. 1
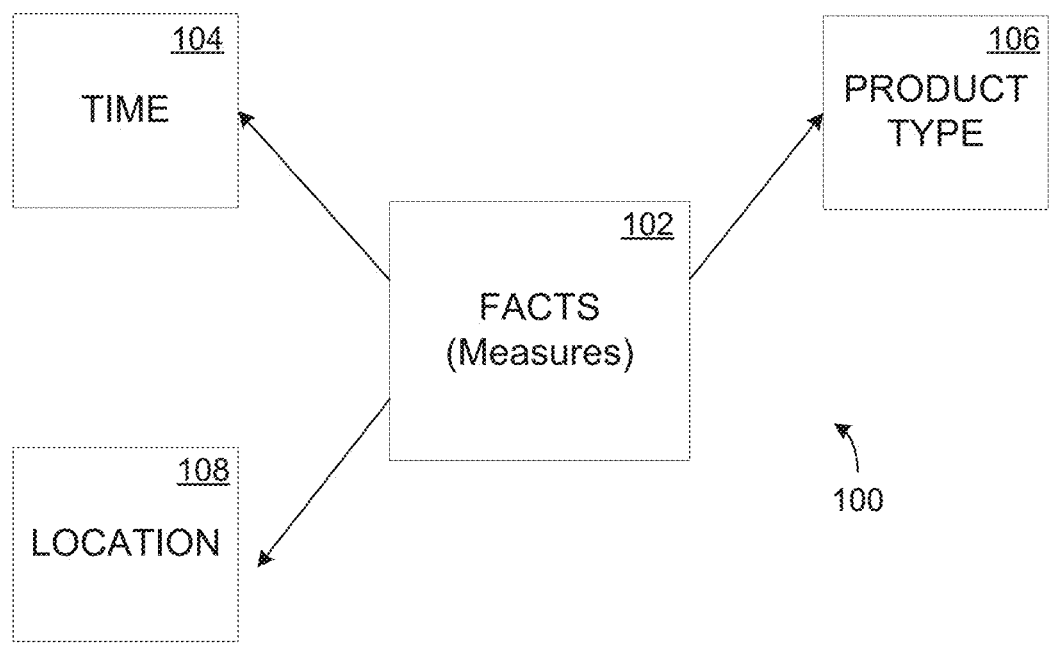
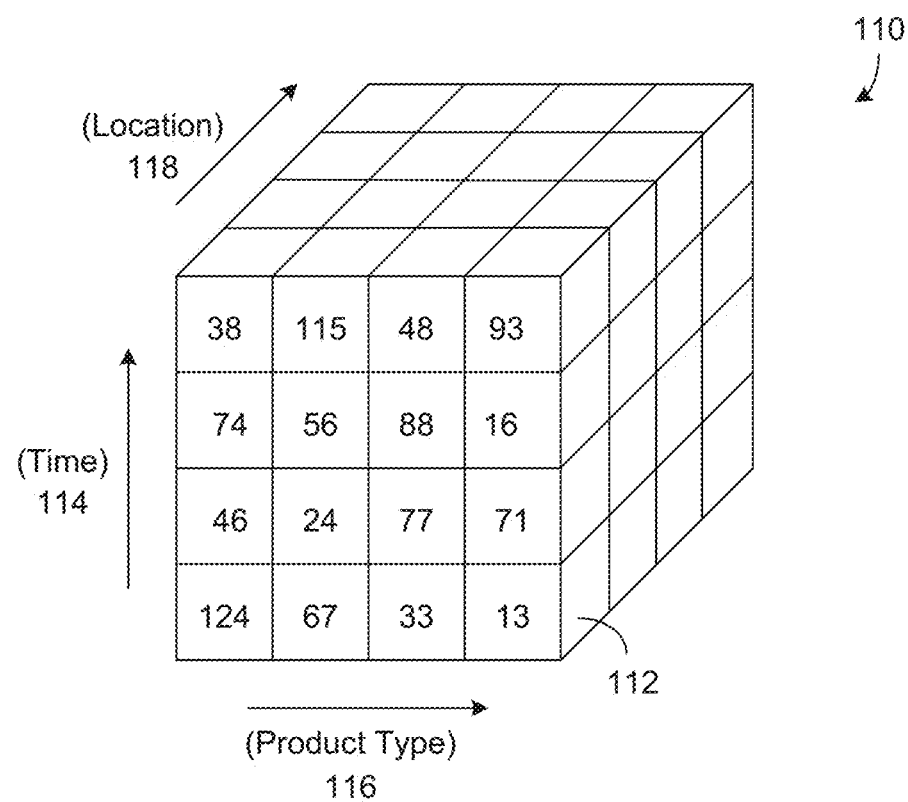

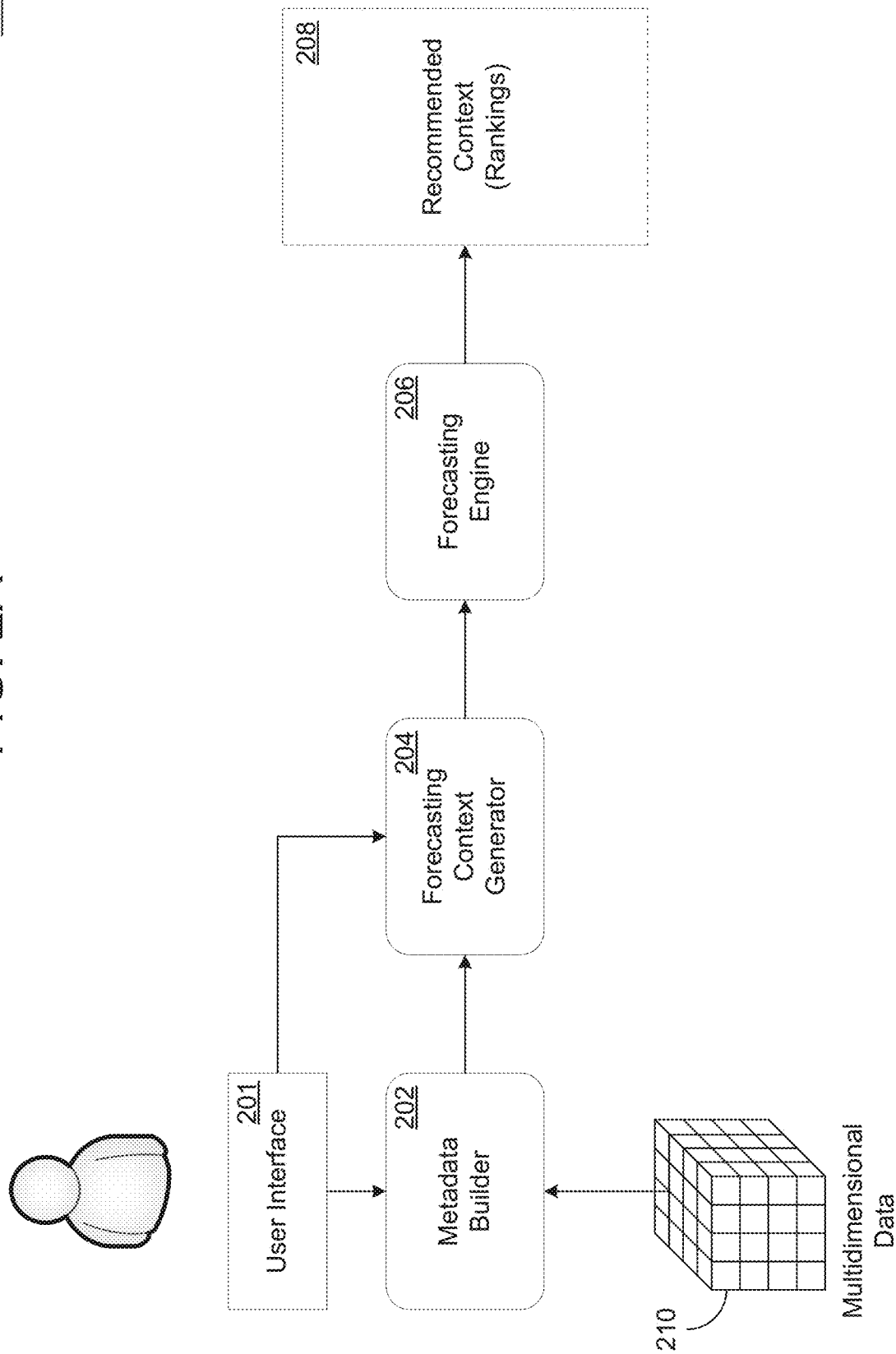

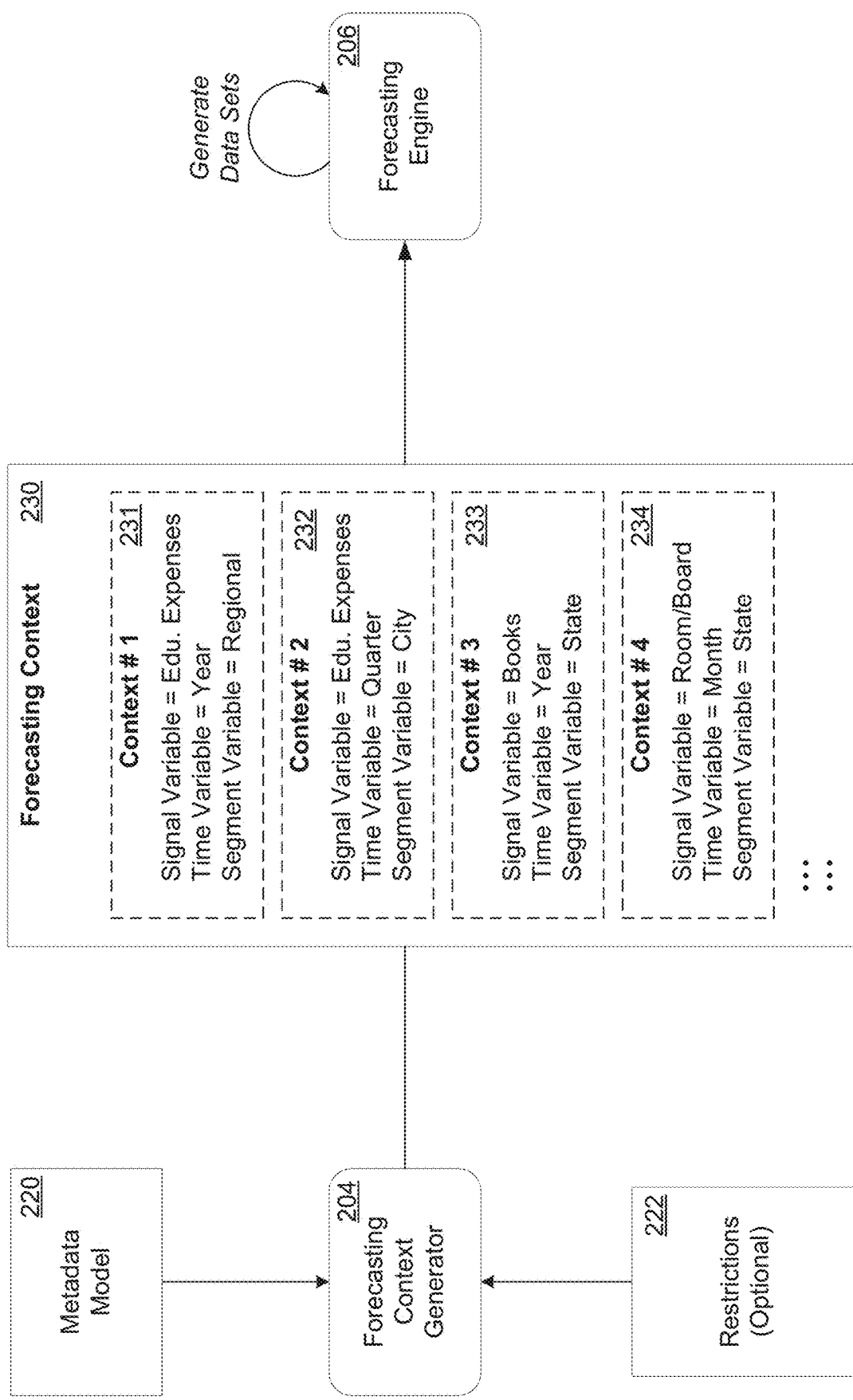

MULTIDIMENSIONAL HIERARCHY LEVEL RECOMMENDATION FOR FORECASTING MODELS

BACKGROUND

Time-series forecasting is a machine learning method which takes a series of historical data points of a measure and predicts a future value or values for the measure based on patterns in the historical data points. For example, sales values of an item for the previous ten years may be used to predict a number of sales of the item for the next month. In a two-dimensional data set such as a table, the data points include two values including a value of the measure being predicted (e.g., sales, etc.) and a value for time. Before the data can be used to train the machine learning algorithm, the data may be aggregated to create features. How the data is aggregated is usually determined by a person (i.e., a data analyst). For example, the measure of data may be aggregated over days, weeks, months, years, etc. The feature generation process is significantly more difficult when the data set is multidimensional data (i.e., more than two dimensions of data attributes).

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1 is a diagram illustrating a multidimensional data model in accordance with an example embodiment.

FIG. 2A is a diagram illustrating an architecture of a hierarchy level recommendation system in accordance with an example embodiment.

FIG. 2D is a diagram illustrating a process of generating context for predictive data sets in accordance with an example embodiment.

Figure 2B:
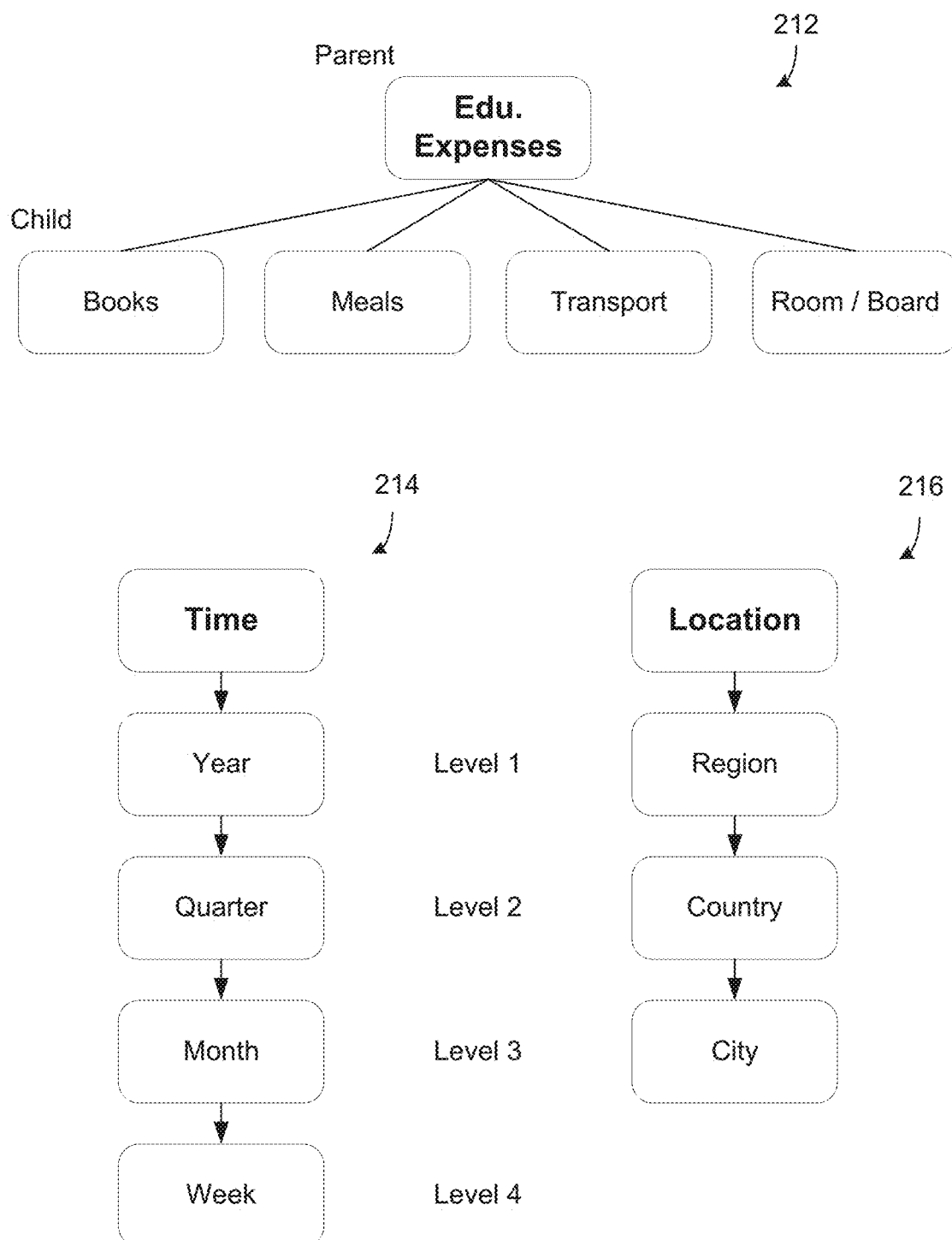
FIG. 2B is a diagram illustrating hierarchical attributes of the multidimensional data in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Machine learning is a field of artificial intelligence that uses statistical techniques to give computer systems the ability to learn from data without being explicitly programmed. The learning process may be progressive in that the learning improves the more times that the machine learning algorithm(s) is trained. One example of a machine learning algorithm that is commonly used is time-series forecasting, also referred to as time-series. Time-series forecasting is the use of a machine learning model to predict future values of a measure (variable) based on previously observed values of the measure. As one example, historical values of a measure such as expenses, sales, etc., may be input into a forecasting algorithm (e.g., autoregression, moving average, vector autoregression, simple exponential smoothing, etc.) and used to train a model that predicts future values of the measure such as expenses, sales, etc.

Multidimensional data (also referred to as multidimensional models) are data models in which the data is organized into measures or facts (e.g., some quantity of numerical data, etc.) and three or more dimensions (characteristics of the data). As a non-limiting example, a number of products sold may be a measure and the dimensions may include time of sale, region where the sale occurred, product type of the item, store location where the product was sold, etc. The measures are typically numerical values that can be aggregated using different aggregation functions (SUM, COUNT, MIN, MAX, DISTINCT COUNT, AVERAGE, etc.). Meanwhile, dimensions describe the data and may be organized into hierarchies. For example, hierarchies can include parent-child hierarchies where a data item can be sub-divided into a plurality of smaller categories (e.g., an employee category may have one manager that breaks down into five assistant managers, where the assistant managers are considered a child level of the manager level, etc.) Also, the measures themselves may include hierarchies.

Before creating a machine learning algorithm, the multidimensional data may be converted into features (e.g., columns of data) in two-dimensional, tabular format. The features are typically derived using one or more aggregation functions on various cubes of data from the multidimensional data set. For multidimensional data, there are usually different levels of aggregation in the respective dimensions. For example, for the time dimension, the data may be aggregated on a yearly basis, a quarterly basis, a monthly basis, a weekly basis, or the like. The different levels of aggregation (or hierarchy) may result in a different set of training data which causes the predictive model to train differently. The resulting trained models may have different predictive performance (i.e., accuracy) based on the level of aggregation used for the training data. Furthermore, choosing the level of aggregation for a given multidimensional data model can be more difficult than choosing the level of aggregation for a two-dimensional data set since there are more dimensions of data and possibly more level combinations to choose from for the dimensions.

Because the process can be very difficult, a subject matter expert (i.e., a human) typically determines at what hierarchical level the multidimensional data is to be aggregated during training of a machine learning model. This process is typically carried out based on the domain knowledge of the subject matter expert. However, given the number of possible combinations of hierarchies, it is not feasible for a human to consider the many different possible combinations of hierarchies and then train the machine learning model for the respective combinations. Instead, the person usually makes a best-guess at the hierarchies.

The example embodiments are directed to a system which can identify different possible aggregation hierarchies (e.g., granularity) for a multidimensional data set/model, aggregate the underlying data in these different possible hierarchies, and generate a plurality of different training data sets that correspond to the different possible hierarchies. The system can then train a number of instances of a machine learning model (e.g., time-series forecasting model, etc.) using the different training data sets. The system can then compare the predictive results of the respective instances to actual results to determine a predictive performance of the different instances of the machine learning model. The system can then rank these instances based on the predictive performances (i.e., predictive accuracy) and output this information for a user along with a description of the hierarchy levels that are used to create the training data set for an instance. Accordingly, a user can see the best possible option (or options) for aggregating the multidimensional data without having to perform a guess/check operation. The hierarchy levels or granularities may also be referred to as "context" of the time-series forecasting model.

As an example, a user may be interested in predicting expenses for a company for the next month. To do so, the user may provide a multidimensional data set that includes previous expenses (e.g., the measure) along with attributes such as store location, time period, specific expense types, etc. Here, the store location, time, and specific expenses may be used to model the dimensions of the expenses in multidimensional format. In this example, the system may create a plurality of predictive data sets for training a time-series forecasting model by changing the hierarchy levels (i.e., the level of granularity) of aggregation of different dimensions for the multidimensional data set. The data being aggregated (e.g., the measure) may be the same or partially the same (overlapping) in more than one of the predictive data sets. However, how the data is realized is different.

For example, one data set may include the data aggregated at an individual store level. Another data set may include the data aggregated at a regional level (e.g., east coast, west coast, etc.). Also, the granularities of the other hierarchical dimensions may also be modified. For example, expense type may be set to multiple expenses, or specific expense types such as wages, rent, inventory, etc. Also, the granularity/hierarchy level of time may be modified as well. The result is many different combinations of hierarchy levels that are available for aggregation. The system described herein may output the best combination of a set of the best combinations. For example, the system may detect that expenses [all expenses], location [region level], and time [yearly level], may create the most accurate predictive model.

FIG. 1 illustrates multidimensional data model in accordance with an example embodiment. Referring to FIG. 1, a multidimensional data set 100 includes a set of facts 102 that include different attributes 104, 106, and 108. In this case, the attributes 104, 106, and 108, can be used to model the data in a multidimensional model 110 which includes dimensions 114, 116, and 118, corresponding to attributes 104, 106, and 108, respectively. The result is the multidimensional model 110 that has a cubic structure, often referred to as cubes. The cube is broken up into a bunch of smaller cubes (cells 112) based on the different hierarchies of attributes included in the dimensions 114, 116, and 118.

Also, the data may be aggregated using different aggregation functions to generate features from the multidimensional data. For example, Sales may be summed from the last year to generate a feature of sales for the year. As another example, Sales may be aggregated for the past 5 years, then averaged per year, to determine the average sales per year for the last 5 years. The data becomes even more specific when a specific location and a specific product are specified. For example, sales of shoes at the store located in Raleigh, NC involves slicing out data from a subset of the cubic structure shown in FIG. 1.

As further described in the examples of FIGS. 2A-2E, features can be derived from the multidimensional data model via aggregation functions and converted into a flat format/structure. These features can be used to train a predictive model such as a machine learning algorithm (e.g., time-series forecasting, etc.)

FIG. 2A illustrates an architecture of a hierarchy level recommendation system 200A for multidimensional data in accordance with an example embodiment. Referring to FIG. 2A, the recommendation system 200A may include a metadata builder 202, a forecasting context generator 204, and a forecasting engine 206. In this example, the system (e.g., the metadata builder 202, the feature context generator 204, etc.) may receive a core measure from the user via a user interface 201. The core measure is a quantity that is included within a multidimensional data set 210. Here, the core measure represents the measure that is to be predicted by a time-series forecasting model. An example of the core measure may be sales, expenses, units, etc. The core measure is typically a numerical value. In some embodiments, the user may also provide optional dimensional limits such as time, locations, product types, etc.

The metadata builder 202 may extract metadata from a multidimensional data model 210 including measures, dimensions, hierarchies of the dimensions, aggregation functions available, and the like. In some embodiments, the core measure may be referred to as a signal variable. The signal variable may represent the core measure itself (e.g., total sales) or a descendant of the core measure (e.g., sales of red shoes, etc.). The time variable may identify different time-based hierarchies that can be used for aggregation such as years, quarters, months, weeks, days, hours, and the like. The other dimensions of the multidimensional data 210 may be referred to as segment variables. Examples of segment variables include location, product type, sales type, store, geography, etc. The segment variable may also have different hierarchy levels for aggregation.

The forecasting context generator 204 may receive the metadata from the metadata builder 202, and any user inputs, and generate "context" for predictive data sets. Here, the context may identify dimensions and hierarchy levels of a dimension to be used for aggregating the multidimensional data. The forecasting context generator 204 may generate the possible combinations of hierarchy levels for the dimensions, or may be limited to specific hierarchy levels by the user input. As an example, a sales value may be aggregated at a monthly granularity or a yearly granularity. Different levels of aggregation may result in a different predictive performance.

The forecasting context generator 204 may provide the forecasting context to the forecasting engine 206 which queries the multidimensional data 210 based on the forecasting context (different dimensions/hierarchies for aggregation) and retrieves a plurality of data sets corresponding thereto. The forecasting engine 206 may train a plurality of instances of the time-series forecasting model using the plurality of data sets. For example, the respective data sets may be used to train different respective instances of the time-series forecasting model. The result is a plurality of instances of a time-series forecasting model which are trained on the same data but with different hierarchies used for aggregation.

The forecasting engine 206 may also determine an accuracy value for the plurality of instances of the time-series forecasting model. In this case, the forecasting engine 206 may process historical data using a trained instance of the time-series forecasting model and compare the output of the trained instance to an actual result already included with the historical data to identify how different the predicted results are to the actual results. For example, a Horizon-Wide Mean Absolute Percentage Error (MAPE) metric may be used to determine a performance level (accuracy level) and confidence interval. The forecasting engine 206 may repeat this process for the respective instances of the trained time-series forecasting model, generate performance level scores for each instance, and output a ranked list 208 of the instances with identifiers of the forecasting context used for aggregation in each instance. Thus, a user is automatically provided with the most accurate hierarchy levels of aggregation for the multidimensional data.

In this example, the metadata builder 202, the forecasting context generator 204, and the forecasting engine 206 may be embedded within a software application or a combination of software modules that are running on a hardware device such as a server, a database, a cloud platform, a user device, or the like. In some embodiments, the metadata builder 202, the forecasting context generator 204, and the forecasting engine 206 may be replaced with or otherwise controlled by a processor such as a hardware processing device.

FIG. 2B illustrates hierarchical attributes of the multidimensional data in accordance with an example embodiment. Referring to FIG. 2B, a core measure (educational expenses) has a parent-child hierarchy 212 as shown at the top of FIG. 2B. Here, the parent is the total educational expenses. Meanwhile, four child-expenses include books, meals, transportation, and room/board. In this case, the predictive data set may include an aggregation of educational expenses or an aggregation of just one or more of the child expenses to create the derived features of the predictive data set for training the machine learning model (time-series forecasting model).

The multidimensional data also includes level based hierarchies 214 for time and 216 for location. Here, a level can be further drilled down into a lower level until a bottom level of the hierarchies 214 and 216 is reached. For example, the time hierarchy 214 can be drilled down into years, quarters, months, weeks, and the like, respectively, which can be used for aggregating the measure into the derived features. Meanwhile, the location hierarchy 216 (i.e., geographic location) may be drilled down into region (e.g., North America, etc.), country (e.g., Mexico, etc.), and city (e.g., Cancun, etc.). It should be appreciated that these hierarchies and dimensions are just for purposes of example and that many different measures, attributes, hierarchies, and aggregation functions may be present.

Figure 2C:
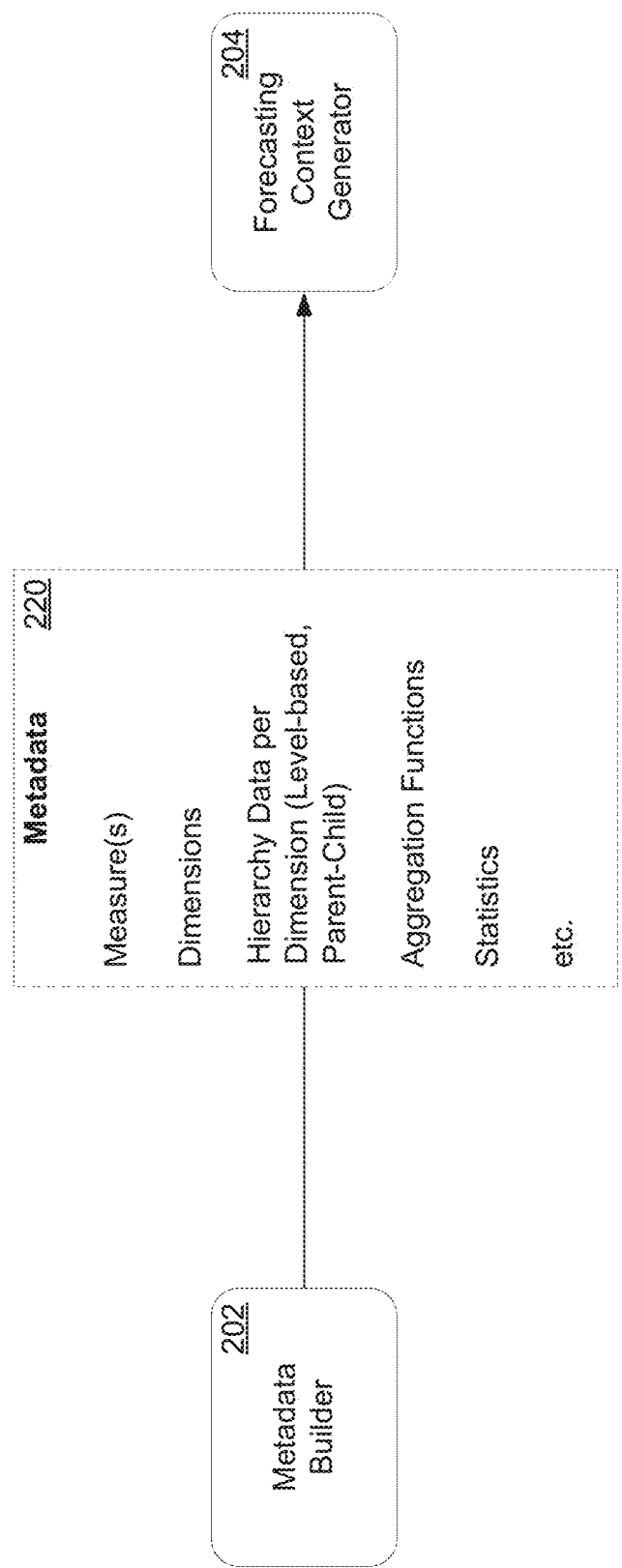
FIG. 2C is a diagram illustrating a process of building a metadata model that is extracted from multidimensional data in accordance with example embodiment.

FIG. 2C illustrates a process 200C of building a metadata model 220 that is extracted from multidimensional data by the metadata builder 202, in accordance with example embodiment. Here, the metadata model 220 is provided to the forecasting context generator 204. Referring to FIG. 2C, the metadata model 220 may include a description of measures included within the multidimensional data. Measures include numeric values that can have aggregation functions applied thereto. The aggregation function enables the measure to be summarized along dimension hierarchies. In some embodiments, the measure may have a unit, a currency, or other attribute. The metadata model 220 may also include dimensions of the measure. The dimensions include attributes that describe the measure. For example, if the measure is measuring sales of a product, the dimensions may include attributes such as product name, product category, size, color, store location, geographic region, time, etc. The dimensions may be values that are hierarchical in nature. For example, the dimension of geographical region may include a hierarchy such as Country→Region→City→Town, etc. As another example, the dimension of time may include a hierarchy such as Year→Quarter→Month→Week→Day, etc.

In addition to the measures and the dimensions, the metadata model 220 may include identifications of the aggregation functions that can be applied to the measure along one or more of the dimensions. Aggregation functions include summation, minimum, maximum, count, distinct count, average, etc. The metadata model may also include additional statistics about the data that can provide additional insight. Furthermore, in some embodiments, the metadata model 220 may include restrictions or other filters that have been added to the feature generation process by a user. For example, restrictions may be placed on which dimensions to use, which portions of which dimension to use, time restrictions, location restrictions, etc.

FIG. 2D illustrates a process 200D of generating forecasting context 230 for predictive data sets in accordance with an example embodiment. Referring to FIG. 2D, the forecasting context generator 204 may receive the metadata model 220 from the metadata builder 202 and any restrictions 222 input by the user, which are optional. For example, the restrictions 222 may include limits, filters, pivots, etc., on the multidimensional data to reduce the feature generation space. The forecasting context generator 204 may generate a list of contexts (forecasting context 230) which include a different respective combination of hierarchies to be used for aggregation. In this example, the forecasting context generator 204 generates contexts 231, 232, 233, and 234 with different hierarchy levels/granularities specified for three variables including a core dimension (signal variable), a time dimension, and a segment variable (location). The contexts 231, 232, 233, and 234 may include an informal description, declarative statement, etc., which identifies the hierarchies to use for the dimensions of the multidimensional data when aggregating the underlying measure/core dimension.

When data is organized in hierarchies in multiple dimensions, even the signal variable (value to predict) can be divided into hierarchies. For example, educational expenses can be divided into books, room and board, meals, transportation, etc. The forecasting context generator 204 can modify at which level of the hierarchy the measure is aggregated when deriving the features for the predictive data set that is used to train the time-series forecasting model. The forecasting context generator 204 may forward the forecasting context 230 to the forecasting engine 206 which can generate formal queries (multidimensional queries) based on the forecasting context 230 and retrieve different training data sets that are used to train different instances of the machine learning model.

The performance of a time-series forecasting model may change when the data is aggregated at different hierarchies because of the data. As an example, if the predictive model is specific to a sub-category of expenses (e.g., books), there is a good chance that the predictive performance of the forecasting model will be better based on using books instead of the educational expense.

However, there are also situations where the finer granularity is not more accurate. For example, a user may want to train a model to predict how many units of a product will be purchased next month. In this example, people may purchase the same amount of the given product (e.g., eggs, etc.) every week. However, different brands may be purchased based on sales prices, availability, taste, etc. Therefore, a data set which aggregates the product purchases at the brand level of egg may not yield the most accurate prediction in comparison to a machine learning model which aggregates the product purchases at a general level above the brand-level. There is no one size fits all solution. The system described herein takes away the guessing because it can generate the different hierarchies for aggregation, train the model, and perform a comparison of the predictive performance.

Figure 2E:
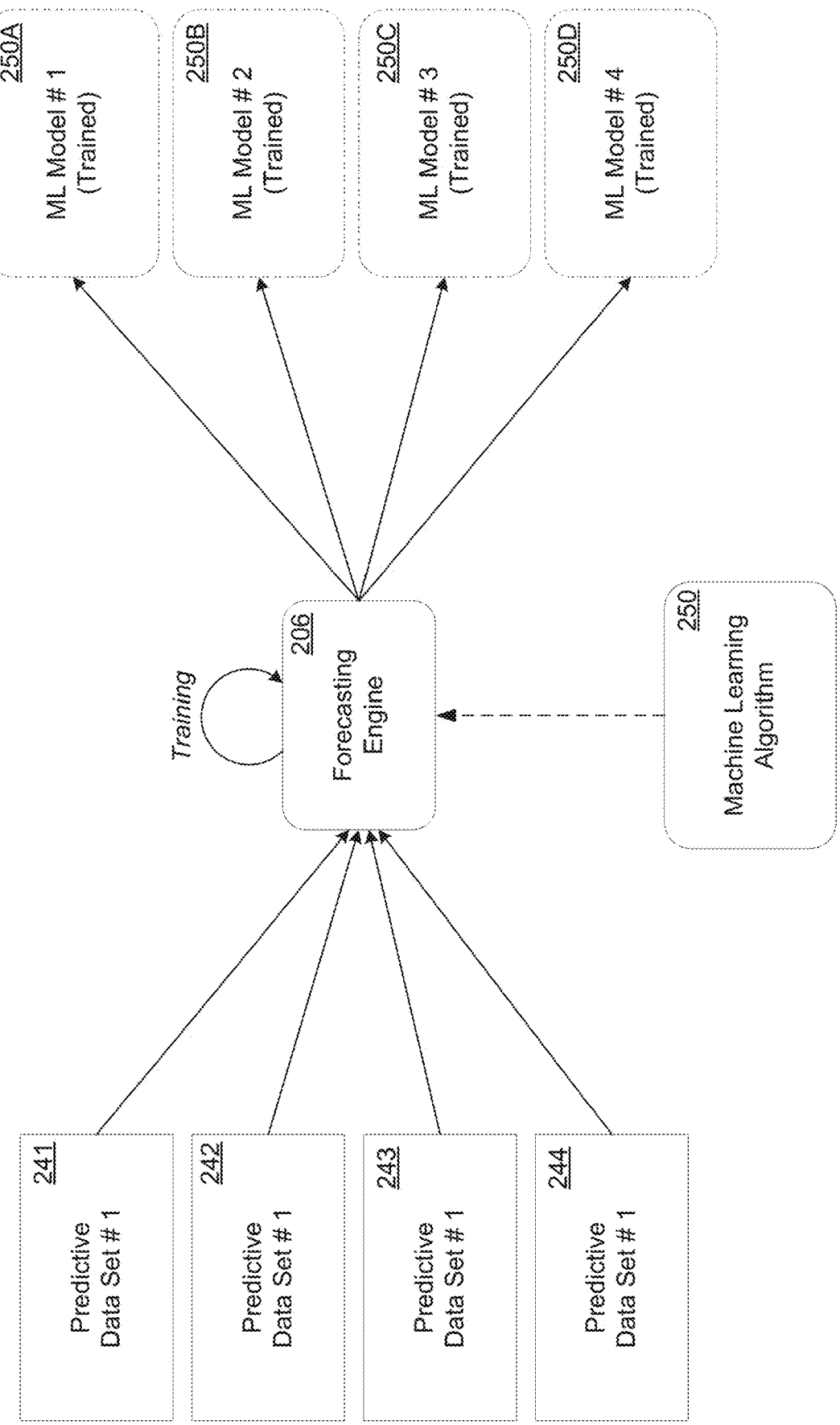
FIG. 2E is a diagram illustrating a process of training a plurality of instances of a machine learning model in accordance with an example embodiment.

FIG. 2E illustrates a process 200E of training a plurality of instances of a machine learning model based on the predictive data sets in accordance with an example embodiment. Referring to FIG. 2E, the forecasting engine 206 may generate predictive data sets 241, 242, 243, and 244 by querying the multidimensional data model 210 based on the feature context 230 provided from the feature context generator 204. The predictive data sets 241, 242, 243, and 244 may correspond to the contexts 231, 232, 233, and 234, respectively. The predictive data sets 241-244 may include different hierarchy levels used for aggregating the multidimensional data measure (core dimension) to be used for training a machine learning (ML) model which may be a time-series forecasting model.

In this example, the forecasting engine 206 may train a different machine learning model using a machine learning algorithm 250. For example, the machine learning algorithm 250 may execute different predictive data set from among the plurality of predictive data sets 241, 242, 243, and 244. The result is a plurality of instances of a trained machine learning model 250A, 250B, 250C, and 250D corresponding to predictive data sets 241, 242, 243, and 244, respectively. Here, the instances of the trained machine learning models 250A, 250B, 250C, and 250D may be executed on a host system and used to perform predictions based on historical data. In doing so, the forecasting engine 206 can determine a predictive capability of the different instances of the trained machine learning model 250A, 250B, 250C, and 250D.

For example, the forecasting engine 206 may run a segmented time-series forecasting algorithm and compute a Horizon-Wide MAPE metric (or other performance indicator) which identifies how accurate a machine learning model is by comparing the results of the prediction of a machine learning model to actual results. By using historical data, the results are already available. Thus, the system can determine a predictive performance of the respective instances of the plurality of trained machine learning models 250A, 250B, 250C, and 250D, using the historical data. Furthermore, the system may store or otherwise output/transmit, to a user, a copy or file that stores any of the trained machine learning models 250A, 250B, 250C, and 250D so that the user can use the trained machine learning models.

Figure 3:
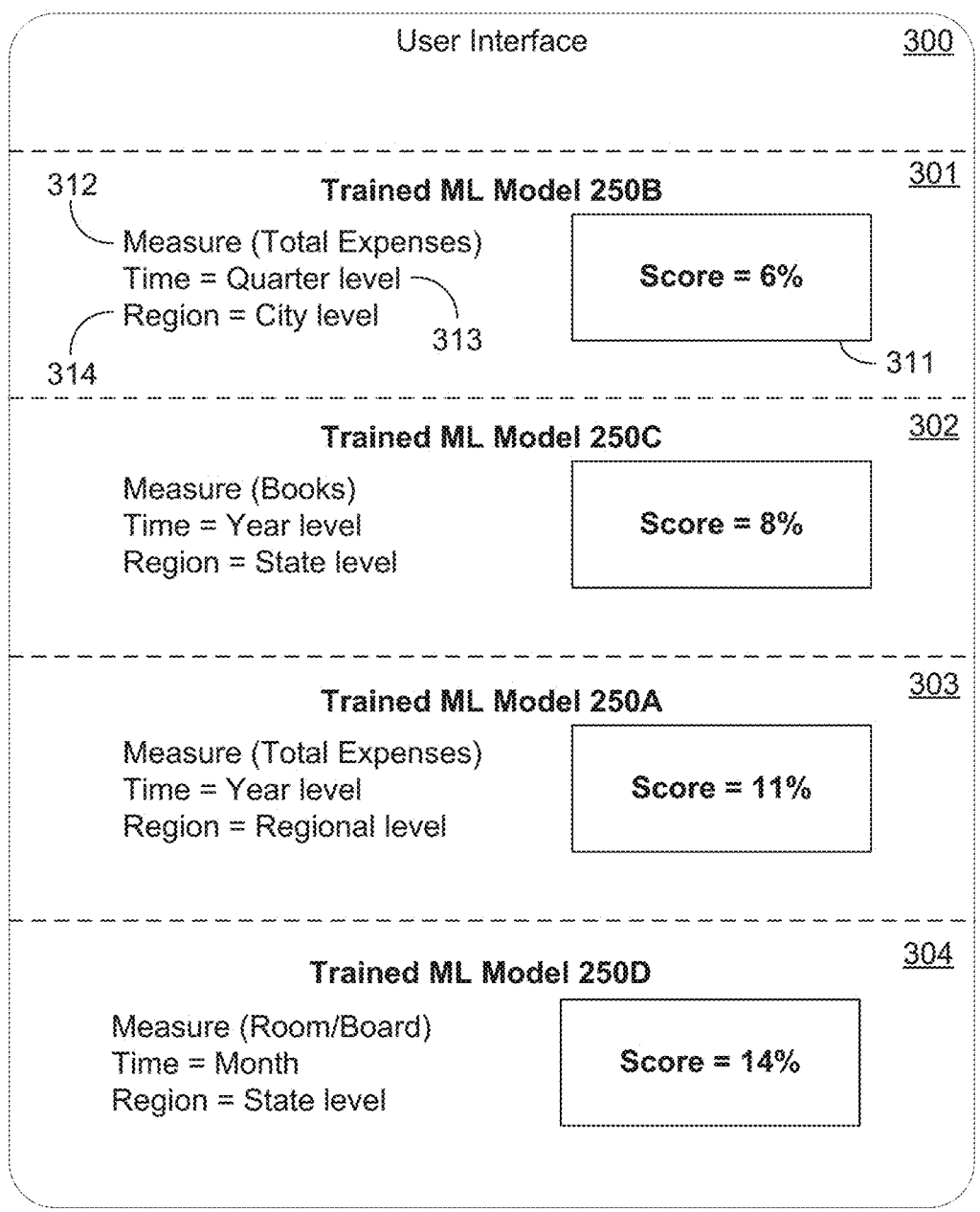
FIG. 3 is a diagram illustrating a user interface displaying a context recommendation for a predictive model in accordance with an example embodiment.

Furthermore, the forecasting engine 206 may rank the results and provide recommendations at the best forecasting context (hierarchy levels for aggregation) to use when training the machine learning model. For example, rankings 301, 302, 303, and 304 may be output via a user interface 300 as shown in FIG. 3. Here, the rankings 301-304 corresponds to a trained machine learning model 250A, 250B, 250C, and 250D. The rankings 301-304 may be ordered based on the best predictive performance to the worst predictive performance. A ranking may include a score value 311 representing an accuracy value (MAPE metric). Here, the lower the value the more accurate the model. A ranking may also include identifiers 312, 313, and 314 of the hierarchies used for the dimensions during the aggregation of the training data.

According to various aspects, the system may identify may reformulate a data set to generate different predictive data sets by adjusting hierarchies at which the underlying data (measure) is aggregated. Each iteration may modify one or more hierarchy/aggregation levels. Furthermore, the system can train different instances of a machine learning model using the different predictive data sets to generate different variations of the machine learning model with different predictive performance capabilities. The system determines the predictive performance of the different variations and outputs for display thereby providing a viewer with the best model and its hierarchy levels used for aggregation.

Figure 4:
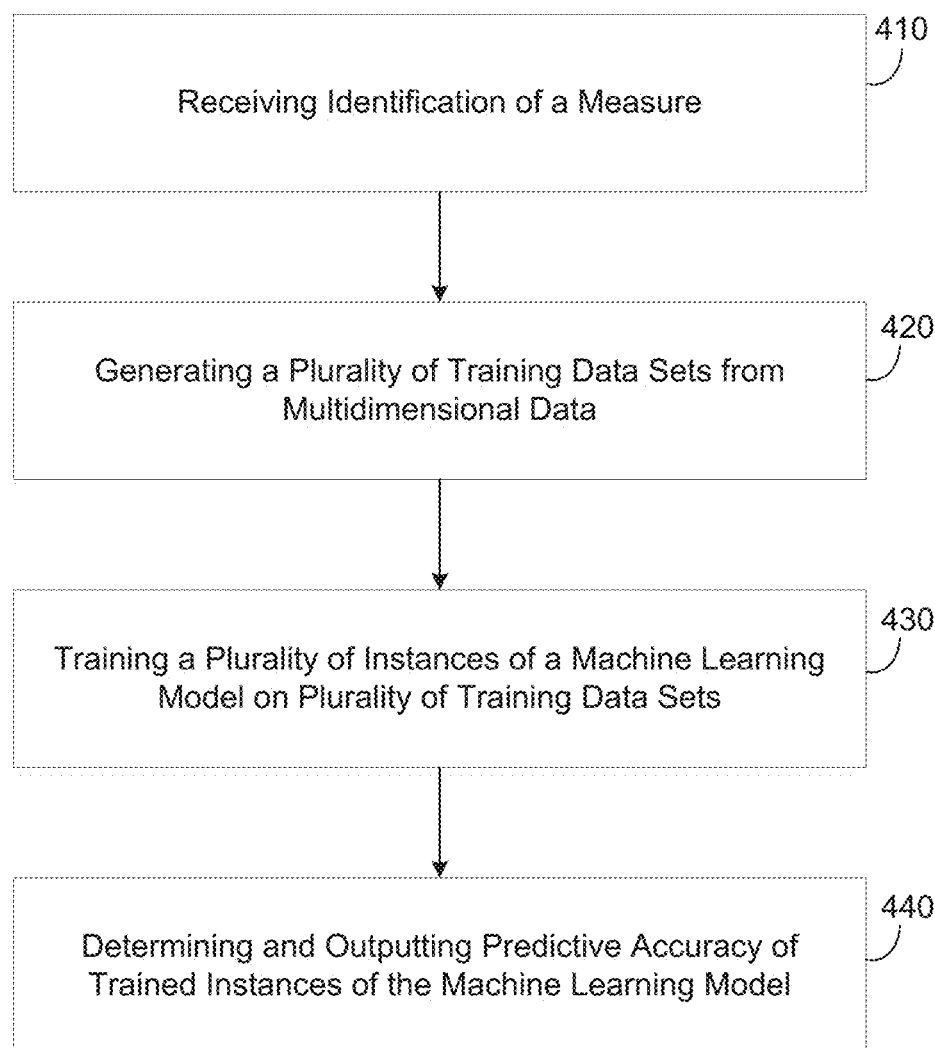
FIG. 4 is a diagram illustrating of a method of generating recommended context for a predictive model in accordance with an example embodiment.

FIG. 4 illustrates a method 400 of generating recommended context for a predictive model in accordance with an example embodiment. For example, the method 400 may be performed by a database node, a cloud platform, a server, a computing system (user device), a combination of devices/nodes, or the like. Referring to FIG. 4, in 410, the method may include receiving an identification of a measure of multidimensional data. For example, the identification may include a variable or measure. For example, historical values of the variable may be used to predict future values of the variable using a predictive model such as a time-series forecasting model.

According to various embodiments, the variable may be organized and stored in a multidimensional model format (e.g., one or more dimensions, two or more dimensions, three or more dimensions, etc.) where one of the dimensions is a time value. In some embodiments, the method may further include building a metadata model based on a hierarchical structure of the multidimensional data which includes hierarchies of dimensions and aggregation functions available for the dimensions, and generating the plurality of predictive data sets based on the metadata model.

In 420, the method may include generating generate a plurality of training data sets that comprise different combinations of hierarchical dimension granularities of aggregation. Here, the training data sets (also referred to as predictive data sets) may be created by aggregating the underlying data from the multidimensional data using different hierarchy levels. In the example of the value for time, aggregation may be performed at the year level, quarter level, month level, week level, and the like. The different dimensions may have different aggregation granularities that are available, referred to herein as hierarchies. In some embodiments, the generating may include generating at least two predictive data sets from a same cube of the multidimensional data using a different granularity for time, respectively. In some embodiments, the generating may include generating at least two predictive data sets from a same cube of the multidimensional data using a different granularity for the measure, respectively.

In 430, the method may include training a plurality of instances of a machine learning model based on the plurality of training data sets, respectively. For example, the machine learning model may include a time-series forecasting model, and the training may include training a plurality of instances of the time-series forecasting model with different hierarchical context for the multidimensional data. In some embodiments, the training may include, for the predictive data sets, executing the machine learning model on the respective predictive data sets to generate a corresponding instance of the trained machine learning model.

In 440, the method may include determining and outputting predictive accuracy values of the plurality of instances of the trained machine learning model. In some embodiments, the determining may include determining the predictive performance of an instance of the trained machine learning model based on a comparison of a forecasted output of the trained machine learning model with actual output. In some embodiments, the determining may include ranking the plurality of instances of the trained machine learning model from most accurate to least accurate based on the predictive performance values, and outputting the rankings for display.

Figure 5:
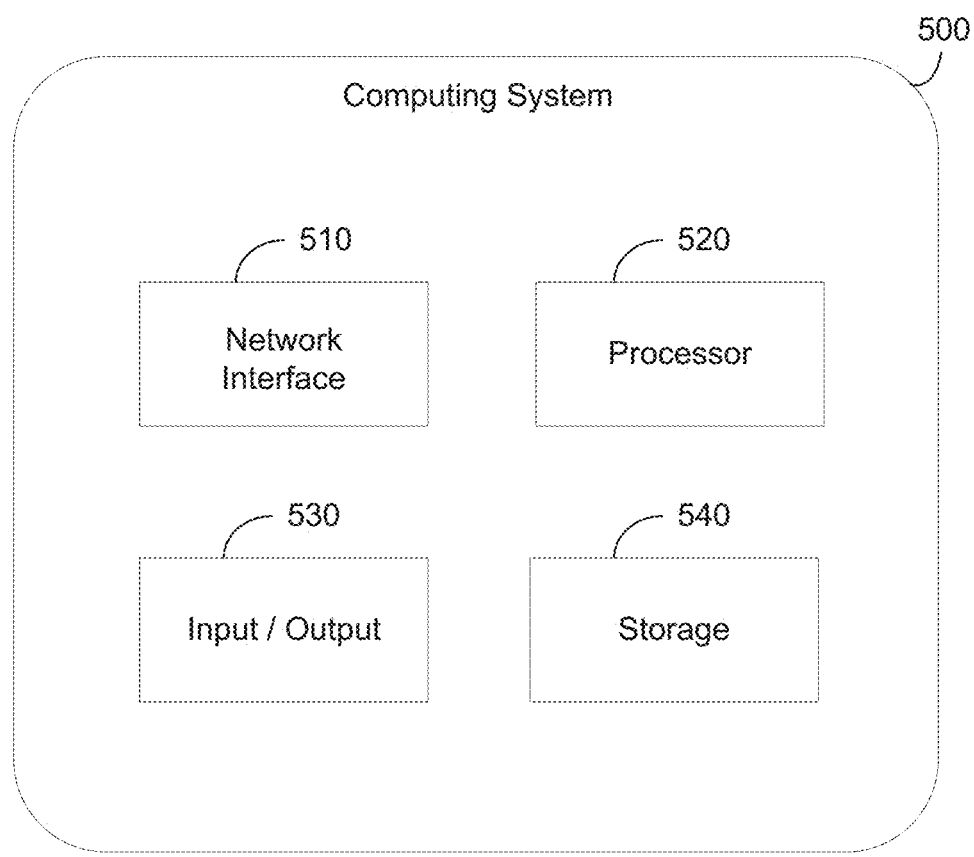
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes. Referring to FIG. 5, the computing system 500 includes a network interface 510, a processor 520, an input/output 530, and a storage device 540 such as an in-memory storage, and the like. Although not shown in FIG. 5, the computing system 500 may also include or be electronically connected to other components such as a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage device 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the method shown in FIG. 5. According to various embodiments, the storage 540 may include a data store that stores data in one or more formats such as a multidimensional data model, a plurality of tables, partitions and sub-partitions, and the like. The storage 540 may be used to store database records, items, entries, and the like.

According to various embodiments, the processor 520 may be configured to receive an identification of a measure of multidimensional data, generate a plurality of training data sets where the training data sets may comprise a different combination of dimension granularities used for aggregation, train a plurality of instances of a machine learning model based on the plurality of predictive data sets, respectively, and determine and output predictive accuracy values of the plurality of instances of the trained machine learning model. For example, the processor 520 may be configured to perform any of the functions, methods, operations, etc., described above with respect to FIGS. 2A-2E, 3, and 4.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to:
receive an identification of a measure of multidimensional data;
extract metadata from the multidimensional data, the extracted metadata identifying a dimension of the measure and a plurality of different granularities applicable to the dimension;
generate, based on the extracted metadata, a plurality of multidimensional queries that comprise a plurality of different granularities of aggregation for the measure identified in the extracted metadata;
query the multidimensional data via the plurality of multidimensional queries to generate a plurality of training data sets;
train a plurality of different instances of a machine learning model via execution of a machine learning algorithm on the plurality of training data sets corresponding to the plurality of different granularities of aggregation, respectively;
determine predictive accuracy values of the plurality of different instances of the machine learning model corresponding to the plurality of different granularities of aggregation;
generate a ranked ordering of the plurality of different instances of the machine learning model based on the predictive accuracy values; and
display, in accordance with the ranked ordering, the predictive accuracy values via a user interface.

2. The computing system of claim 1, wherein the multidimensional data comprises a time dimension.

3. The computing system of claim 1, wherein the processor is further configured to identify restrictions on feature generation from the metadata, and generate the plurality of training data sets based on the identified restrictions.

4. The computing system of claim 1, wherein the processor is configured to generate at least two training data sets from a same cube of the multidimensional data using a different aggregation granularity for time, respectively.

5. The computing system of claim 1, wherein the processor is configured to generate at least two training data sets from a same cube of the multidimensional data using a different aggregation granularity for the measure, respectively.

6. The computing system of claim 1, wherein the processor is configured to, for a training data set, execute the machine learning algorithm on the respective training data set to generate a corresponding instance among the plurality of different instances of the machine learning model.

7. The computing system of claim 1, wherein the processor is configured to determine a predictive accuracy of an instance of the machine learning model based on a comparison of a forecasted output of the instance of the machine learning model with an actual output.

8. The computing system of claim 1, wherein the processor is further configured to arrange identifiers of the plurality of different instances of the machine learning model from most accurate to least accurate based on the predictive accuracy values, and display the arranged identifiers via the user interface.

9. A method comprising:
receiving an identification of a measure of multidimensional data;
extracting metadata from the multidimensional data, the extracted metadata identifying a dimension of the measure and a plurality of different granularities applicable to the dimension;
generating, based on the extracted metadata, a plurality of multidimensional data sets that comprise a plurality of different granularities of aggregation for the measure identified in the extracted metadata;
querying the multidimensional data via the plurality of multidimensional queries to generate a plurality of training data sets;
training a plurality of different instances of a machine learning model via execution of a machine learning algorithm on the plurality of training data sets corresponding to the plurality of different granularities of aggregation, respectively;
determining predictive accuracy values of the plurality of different instances of the machine learning model corresponding to the plurality of different granularities of aggregation;
generating a ranked ordering of the plurality of different instances of the machine learning model based on the predictive accuracy values; and
displaying, in accordance with the ranked ordering, the predictive accuracy values via a user interface.

10. The method of claim 9, wherein the multidimensional data comprises a time dimension.

11. The method of claim 9, wherein the method further comprises identifying restrictions on feature generation from the metadata, and generating the plurality of training data sets based on the identified restrictions.

12. The method of claim 9, wherein the generating comprises generating at least two training data sets from a same cube of the multidimensional data using a different aggregation granularity for time, respectively.

13. The method of claim 9, wherein the generating comprises generating at least two training data sets from a same cube of the multidimensional data using a different aggregation granularity for the measure, respectively.

14. The method of claim 9, wherein the training comprises, for a training data set, executing the machine learning algorithm on the respective training data set to generate a corresponding instance among the plurality of different instances of the machine learning model.

15. The method of claim 9, wherein the determining comprises determining a predictive accuracy of an instance of the machine learning model based on a comparison of a forecasted output of the instance of the machine learning model with actual output.

16. The method of claim 9, wherein the outputting comprises arranging identifiers of the plurality of different instances of the machine learning model from most accurate to least accurate based on the predictive accuracy values, and displaying the arranged identifiers via the user interface.

17. A non-transitory computer-readable medium comprising instructions which when read by a processor cause a computer to perform a method comprising:
receiving an identification of a measure of multidimensional data;
extracting metadata from the multidimensional data, the extracted metadata identifying a dimension of the measure and a plurality of different granularities applicable to the dimension;

generating, based on the extracted metadata, a plurality of multidimensional queries that comprise a plurality of different granularities of aggregation for the measure identified in the extracted metadata;

querying the multidimensional data via the plurality of multidimensional queries to generate a plurality of training data sets;

training a plurality of different instances of a machine learning model via execution of a machine learning algorithm on the plurality of training data sets corresponding to the plurality of different granularities of aggregation, respectively;

determining predictive accuracy values of the plurality of different instances of the machine learning model corresponding to the plurality of different granularities of aggregation;

generating a ranked ordering of the plurality of different instances of the machine learning model based on the predictive accuracy values; and displaying, in accordance with the ranked ordering, the predictive accuracy values via a user interface.

18. The non-transitory computer-readable medium of claim 17, wherein the multidimensional data comprises a time dimension.

19. The non-transitory computer-readable medium of claim 17, wherein the method further comprises identifying restrictions on feature generation from the metadata, and generating the plurality of training data sets based on the identified restrictions.

20. The non-transitory computer-readable medium of claim 17, wherein the generating comprises generating at least two training data sets from a same cube of the multidimensional data using a different aggregation granularity for time, respectively.

* * * * *